United States Patent
Chaon et al.

(10) Patent No.: US 10,227,188 B1
(45) Date of Patent: Mar. 12, 2019

(54) BIN SWEEP PIVOTS

(71) Applicant: Duane Cyril Chaon, Mendota, IL (US)

(72) Inventors: Duane Cyril Chaon, Mendota, IL (US); Bruce Meyer, Shorewood, IL (US)

(73) Assignee: Duane Cyril Chaon, Mendota, IL (US)

( * ) Notice: Subject to any disclaimer, the term of this patent is extended or adjusted under 35 U.S.C. 154(b) by 0 days.

(21) Appl. No.: 15/898,684

(22) Filed: Feb. 19, 2018

Related U.S. Application Data

(60) Provisional application No. 62/460,761, filed on Feb. 18, 2017, provisional application No. 62/460,160, filed on Feb. 17, 2017.

(51) Int. Cl.
*B65G 65/42* (2006.01)
*B65G 65/48* (2006.01)

(52) U.S. Cl.
CPC ....... *B65G 65/4881* (2013.01); *B65G 65/425* (2013.01)

(58) Field of Classification Search
CPC ...... B65G 65/22; B65G 65/365; B65G 19/08; B65G 19/04; B65G 19/22; B65G 65/4881; B65G 65/425
USPC ....... 198/728, 733, 519, 520, 550.4, 550.12; 414/309, 310, 313, 319, 327
See application file for complete search history.

(56) References Cited

U.S. PATENT DOCUMENTS

| | | |
|---|---|---|
| 2,763,362 A | 4/1953 | Greaves |
| 2,711,814 A | 6/1955 | McCarthy |
| 3,035,718 A | 6/1960 | Behlen |
| 3,064,831 A | 12/1960 | Cook |
| 3,076,567 A | 2/1963 | O'Dell |
| 3,151,749 A | 10/1964 | Long |
| 3,155,247 A | 11/1964 | Patterson |
| 3,456,818 A | 7/1969 | Massey |
| 3,536,210 A | 10/1970 | Dickinson |
| 3,788,445 A | 1/1974 | Postel-Vinay |
| 3,826,385 A | 7/1974 | Bluntzer |
| 4,146,145 A * | 3/1979 | Easton ............... B65D 88/66 198/676 |
| 4,220,433 A | 9/1980 | Feterl |
| 4,284,369 A | 8/1981 | Gsponer et al. |
| 4,773,808 A | 9/1988 | Fischer et al. |
| 4,806,058 A | 2/1989 | Galichowski et al. |
| 5,167,318 A | 12/1992 | Siemens |
| 5,449,263 A | 9/1995 | Campbell |

(Continued)

FOREIGN PATENT DOCUMENTS

| | | |
|---|---|---|
| GB | 1 327 791 A | 8/1973 |
| GB | 2 076 357 A | 12/1981 |

*Primary Examiner* — James R Bidwell
(74) *Attorney, Agent, or Firm* — Craig A. Fieschko, Esq.; DeWitt LLP

(57) ABSTRACT

Pivot structures for use on bin sweeps, for example at the inner end of a bin sweep or along the length of a bin sweep, include a ball and socket. The socket is preferably defined by a collar having opposing open ends through which a shaft extends, with the shaft also extending through the ball such that the ball can slide on the shaft. The collar/socket is then affixed to a section of a sweep, and the shaft is affixed to an adjacent section, or is alternatively defined by a central stanchion within the bin. The pivot allows the sweep section to move in up to four degrees of freedom with respect to the adjacent section, or with respect to the central stanchion.

20 Claims, 2 Drawing Sheets

(56) References Cited

U.S. PATENT DOCUMENTS

| | | | |
|---|---|---|---|
| 5,944,168 | A | 8/1999 | Campbell et al. |
| 5,960,932 | A | 10/1999 | Adams |
| 6,017,180 | A | 1/2000 | Wilham |
| 6,095,742 | A | 8/2000 | Campbell |
| 6,173,917 | B1 * | 1/2001 | Whitell ................ A01C 15/007 414/526 |
| 6,499,930 | B1 | 12/2002 | Dixon |
| 7,544,031 | B2 | 6/2009 | Kaeb et al. |
| 8,177,470 | B2 * | 5/2012 | Amick ................ B65G 65/466 198/550.6 |
| 8,616,823 | B1 * | 12/2013 | Hoogestraat ........ B65G 65/466 414/310 |
| 8,770,388 | B1 | 7/2014 | Chaon et al. |
| 8,967,937 | B2 | 3/2015 | Schuelke et al. |
| 9,327,937 | B2 | 5/2016 | Olson et al. |
| 2008/0131242 | A1 | 6/2008 | Duffy et al. |
| 2013/0216341 | A1 * | 8/2013 | Luster ................ B65G 65/466 414/326 |

* cited by examiner

BIN SWEEP PIVOTS

CROSS-REFERENCE TO RELATED APPLICATIONS

This application claims priority under 35 USC § 119(e) to U.S. Provisional Patent Application 62/460,160 filed 17 Feb. 2017 and U.S. Provisional Patent Application 62/460,761 filed 18 Feb. 2017. The entireties of these provisional patent applications are incorporated by reference herein.

FIELD OF THE INVENTION

This document concerns an invention relating generally to bin sweeps, and more specifically to pivot arrangements for bin sweeps.

BACKGROUND OF THE INVENTION

Sweeps are devices for removal of agricultural products (e.g., grain) from the floor of a silo or other storage bin. Typically, a sweep has a length which stretches across the bin floor, with the length bearing an auger, a paddle-bearing conveyor, or other means for moving product on the bin floor, such that as the sweep's length is pushed across the floor, the means for moving product "sweeps" the product across the bin floor to one end of the sweep's length (typically an "inner" end of the sweep, at which a sump is provided to receive the product). For useful background regarding sweeps, the reader is referred to U.S. Pat. No. 6,017,180 to Wilham and U.S. Pat. No. 7,544,031 to Kaeb et al., as well as to the patents referenced elsewhere in this document.

It is recognized that sweeps have optimal performance on smooth, flat bin floors. However, particularly in larger bins, flat floors are harder to achieve. Differences in height tend to arise owing to difficulties with fully leveling concrete poured to form the floor, and owing to the ground settling or otherwise shifting beneath the bin floor. To compensate for height irregularities, sweeps are typically constructed to vertically pivot along their lengths, or to at least vertically pivot at their inner ends, so that the length of the sweep (or subsections thereof) can independently raise and lower to better follow the contour of the bin floor as they orbit the floor. As examples, U.S. Pat. No. 6,499,930 to Dixon describes a sweep having an inner pivot, allowing the entirety of the length of the sweep to pivot upwardly and downwardly to follow the height of the grain beneath, and U.S. Pat. No. 8,770,388 to Chaon et al. and U.S. Pat. No. 8,967,937 to Schuelke et al. describe sweeps having sweep sections arrayed along their lengths wherein certain sweep sections are pivotally connected to each other such that one sweep section may vertically pivot in relation to its adjacent sweep section.

In the foregoing pivoting sweeps, the pivots tend to be constructed by simply rotationally pinning sweep sections to each other, and/or to the central bearing about which the length of the sweep rotates. These simple pinned pivots allow some degree of variability in the heights of adjacent sweep sections, but may not allow the sweep and/or its sections to precisely match floor contours. Additionally, these simple pinned pivots can sometimes bind as the sweep is driven about the bin floor, with the adjacent pinned sweep sections being driven forwardly into the grain.

SUMMARY OF THE INVENTION

The invention involves a bin sweep pivot which is intended to at least partially solve the aforementioned problems. To give the reader a basic understanding of some of the advantageous features of the invention, following is a brief summary of preferred versions of the bin sweep pivot, with reference being made to the accompanying drawings (which are briefly reviewed in the following "Brief Description of the Drawings" section of this document) to assist the reader's understanding. Since the following discussion is merely a summary, it should be understood that more details regarding the preferred versions may be found in the Detailed Description set forth elsewhere in this document. The claims set forth at the end of this document then define the various versions of the invention in which exclusive rights are secured.

FIGS. 1A-1B depict a portion of the length of an illustrative bin sweep 10 of the type described in U.S. Pat. No. 8,770,388 to Chaon et al., having an exemplary bin sweep pivot 100 at its inner bin sweep end 12. The bin sweep pivot 100 includes a shaft 102 (here provided by the central bin stanchion rising from the bin floor 14, about which the sweep 10 rotates); a ring 104 movably fit about the shaft 102, whereby the ring 104 is slidable along a length of the shaft 102; and a collar 106 fixed to the inner bin sweep end 12 and pivotably fit about the ring 104, whereby the collar 106 is pivotable within a plane coincident with an axis of the shaft 102 (and more particularly about each of two axes which are perpendicular to an axis of the shaft 102, and to each other). Preferably, at least a significant portion of the outer surface 108 of the ring 104 conforms to a portion of a sphere, such that the ring 104 is essentially defined by a ball having a passage 110 extending between opposing sides of the ball, with the shaft 102 extending through the passage 110. At least a significant portion of the inner surface 112 of the collar 106 then complementarily fits about the outer surface 108 of the ring 104, such that the collar 106 then defines a socket which pivotally receives the ball of the ring 104. Preferably, at least one of the collar 106 and the ring 104 is rotatable about the circumference of the shaft 102, with the ring 104 being rotatable about the shaft 102, and/or the collar 106 being rotatable about the ring 104. The sweep pivot 100 can therefore allow the sweep 10 to move with four degrees of freedom with respect to the shaft 102: the sweep 10 may rotate about the axis of the shaft 102, as well as the axes perpendicular to the shaft 102, and may also translate along the axis of the shaft 102. The sweep pivot 100 thereby allows the sweep 10 to better conform to irregularities in the bin floor 14, such as raised or depressed portions arising from unevenly-poured concrete when the bin floor 14 was formed, and/or arising from settling of the ground and the bin floor 14.

FIG. 2 then illustrates an exemplary use of a similar bin sweep pivot 200 between an inner sweep section 22 and outer sweep section 26 of a sweep 20 of the type described in U.S. Pat. No. 8,770,388 to Chaon et al. The inner sweep section 22 has a vertically-oriented shaft 202 spaced from the sweep section 22 between a pair of opposing plates 24 extending from the rear of the sweep section 22. A ring 204 is slidably fit about the shaft 202, with a collar 206 being pivotably fit about the ring 204. A member 214 then extends from the collar 206 to a bracket 28 protruding from the outer sweep section 26. The outer sweep section 26 is therefore fixed to the collar 206, and the inner sweep section 22 is fixed to the shaft 202, with the outer and inner sweep sections 26 and 22 being slightly spaced from each other to allow each to vertically pivot somewhat with respect to the other. While not shown in FIG. 2, another pivot 200 is situated within the interior of the sweep 20 forwardly of the pivot 200 depicted, connecting the outer and inner sections 26 and 22 within the interior of the sweep 20 and restraining them from pivoting with respect to each other in a horizontal plane (with a similar arrangement being discussed below with respect to FIG. 3). Because the outer and inner sections 26 and 22 are attached via the sweep pivots 200, each section 26/22 may vertically deflect with respect to the other, as well as vertically tilting with respect to the other, thereby allowing the adjacent sweep sections 22 and 26 to better accommodate differences in floor height between the sections.

Further advantages, features, and objects of the invention will be apparent from the remainder of this document in conjunction with the associated drawings.

DETAILED DESCRIPTION OF EXEMPLARY VERSIONS OF THE INVENTION

Figure 1A:
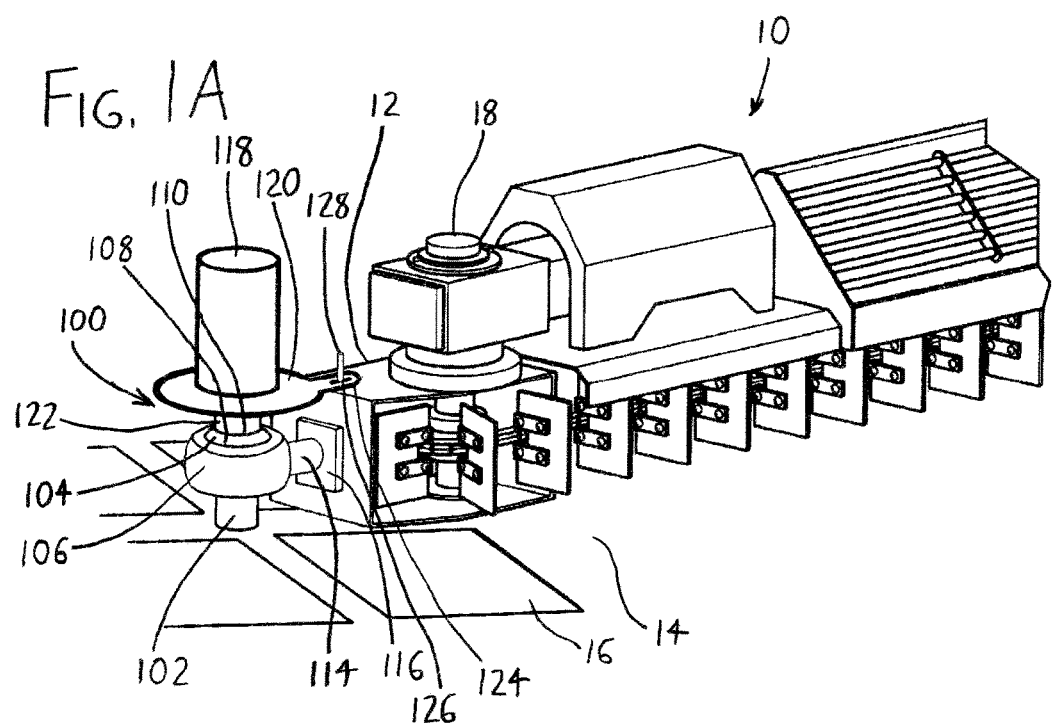
FIG. 1A is a perspective view of the front of a portion of a bin sweep 10 rotatably affixed to orbit a central bin stanchion 102 (and a bin sump 16 beneath) by a bin sweep pivot 100, with the bin sweep pivot 100 including a ring 104 fit about the stanchion 102, a collar 106 fit about the ring 104, and a member 114 affixing the collar 106 to the inner end 12 of the bin sweep 10.
Figure 1B:
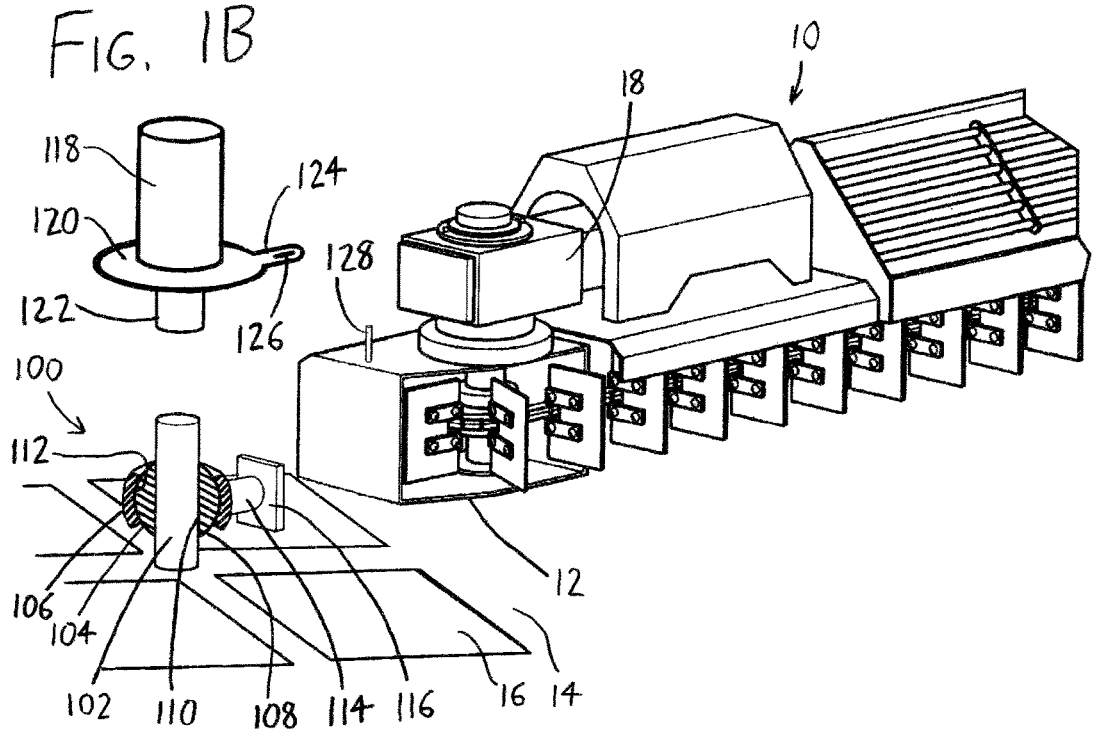
FIG. 1B depicts the bin sweep 10 of FIG. 1A with the bin sweep inner end 12 detached and spaced from the member 114 of the bin sweep pivot 100; with the ring 104 and collar 106 of the bin sweep pivot 100 shown in cross-section about the central bin stanchion 102; and with the slip ring cover 118 raised off of the stanchion 102 and the sweep pivot 100.

Expanding on the foregoing discussion of the bin sweep pivot 100 of FIGS. 1A-1B, the collar 106 is fixed to the inner sweep end 12 via the member 114, which bears a rectangular plate 116 bolted to the inner sweep end 12. Owing to the ability of the ring 104 to translate (and rotate) on the stanchion 102, and the ability of the collar 106 to pivot on the ring 104, as the sweep 10 is driven to revolve on the bin floor 14 about the stanchion 102, the sweep 10 is free to:

a. "float" upwardly if it rides across a raised portion of the bin floor 14 (with the collar 106 urging the ring 104 therein to slide upwardly on the stanchion 102), or conversely to "sink" downwardly if it rides across a depressed portion of the bin floor 14; and/or b. tilt upwardly or downwardly so that portions of the sweep 10 situated outwardly from the inner sweep end 12 may be higher or lower than the inner sweep end 12; and/or c. tilt forwardly or rearwardly about the lengthwise axis of the sweep 10.

The degree of pivotability of the bin sweep pivot 100 may be adjusted by appropriately configuring the collar 106 and ring 104. For example, if the size of the collar 106 is increased to surround a greater amount of the outer surface of the ball-like ring 104, the pivotability of the collar 106 about the ring 104 will be limited because the collar 106 has a lesser degree of rotational movement about the ring 104 before the collar 106 interferes with the shaft/stanchion 102. As another example, if the collar 106 substantially surrounds the ring 104 save for slots (rather than round openings) at the top and bottom of the collar 106, the collar 106 will have no (or limited) pivotability about the lengthwise axis of the sweep 10, preventing the top of the sweep 10 from tilting forwardly or rearwardly along the sweep's length. In similar respects, the ability of the bin sweep pivot 100 to vertically deflect upwardly and downwardly on the shaft/stanchion 102 may be limited by providing protruding stops on the shaft/stanchion 102, whereby the stops prevent the ring 104 from sliding past the stops on the shaft/stanchion 102. The motion of the bin sweep pivot 200 of FIG. 2 may be limited using similar measures.

Typically, to supply the sweep 10 of FIGS. 1A-1B with power as it revolves about the bin, electrical cabling extends from the bin sump 16 into the bottom of the shaft/stanchion 102, and then out of the top of the shaft/stanchion 102, where a slip ring electrically connects to cabling leading to the sweep motor 18. The can-like slip ring cover 118 at the top of the shaft/stanchion 102 covers the slip ring (not shown), and protects it from falling grain within the bin. The bottom floor of the slip ring cover 118 is defined by a round plate 120 having a central hole (not shown) therein, with a tube 122 descending from the plate 120 and extending about the central hole. The descending tube 122 closely fits over the shaft/stanchion 102 until its bottom encounters the ring 104 (and/or the collar 106) of the sweep pivot 100. The slip ring cover 118, its bottom plate 120, and its descending tube 122 therefore ride upon the sweep pivot 100, and can rotate about and slide upon the shaft/stanchion 102 as the sweep 10 revolves about the bin (with the ring 104 of the sweep pivot 100 sliding upon the shaft/stanchion 102, and the collar 106 of the sweep pivot 100 pivoting about the ring 104). The cabling (not shown) extends from an aperture in the slip ring cover 118 to the sweep motor 18 (the aperture also not being shown). To better ensure that the cabling extends directly to the sweep motor 18 in a direction generally parallel to the sweep's lengthwise axis, a tongue 124 extends from the bottom plate 120 of the slip ring cover 118, and has a slot 126 defined therein. A pin 128 extending upwardly from the sweep 10 is situated within the slot 126. The bottom plate 120 of the slip ring cover 118 is therefore loosely engaged to the sweep 10 via the pin 128 and slot 126 so that the plate 120 (and the rest of the slip ring cover 118) rotates about the shaft/stanchion 102 along with the sweep 10. At the same time, the slip ring cover 118 can "float" on the shaft/stanchion 102 and on the sweep pivot 100, i.e., it can translate upwardly and downwardly when needed, and it will not hinder pivoting of the sweep 10 because the pin 128 may tilt within the slot 126.

Figure 2:
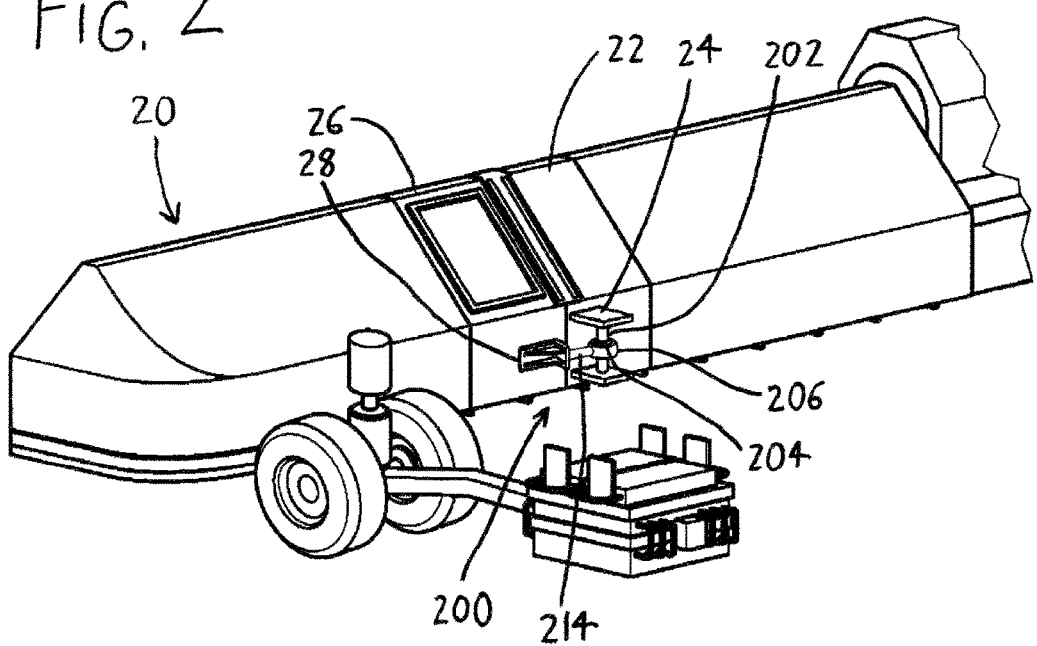
FIG. 2 is a perspective view of the rear of a portion of a bin sweep 20, showing an inner bin sweep section 22 pivotally linked to an outer bin sweep section 26 via a sweep pivot 200 resembling that shown in FIGS. 1A-1B, with the inner bin sweep section 22 bearing a vertically-oriented shaft 202 upon which the ring 204 of the sweep pivot 200 rides, and a collar 206 pivotally mounted about the ring 204 being fixed by a member 214 to a bracket 28 on the outer bin sweep section 26.

In the bin sweep pivots of FIGS. 1A-1B and 2, while the ring 104/204 is shown as a member fully encircling the shaft 102/202, and the collar 106/206 is shown as a member fully encircling the ring 104/204 (and the shaft 102/202), the ring 104/204 and collar 106/206 need not do so, and may be partially open about their circumferences. Nonetheless, the collar 106/206 and the ring 104/204 each preferably extend about at least a substantial portion of the circumference of the shaft 102/202, and most preferably each extend about the entirety of the circumference of the shaft 102/202. The ring 104/204 can be formed of an annular member which is sectioned along its diameter, and which is then bolted or otherwise affixed together about the shaft 102/202. The collar 106/206 can be similarly formed and affixed together about the ring 104/204.

Figure 3:
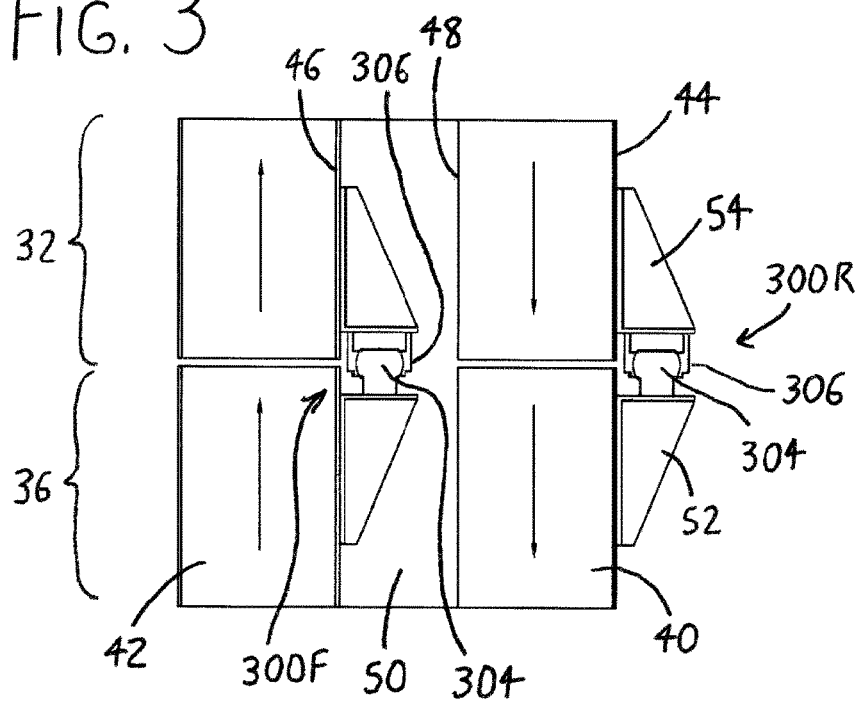
FIG. 3 is a top cross-sectional view of inner and outer bin sweep sections 32 and 36 similar to the inner and outer bin sweep sections 22 and 26 of FIG. 2, showing a rearward bin sweep pivot 300R pivotally linking the rearward outer walls 44 of the inner and outer bin sweep sections 32 and 36 adjacent the rearward return area 40 (wherein the paddles, not shown, travel toward the outer sweep end), and a forward bin sweep pivot 300F which also pivotally links the inner and outer bin sweep sections 32 and 36 at a forward inner wall 46 bounding the forward sweep area 42 (wherein the paddles sweep material toward the inner sweep end).

FIG. 3 shows a top cross-sectional view of an inner sweep section 32 and an outer sweep section 36 similar to those of FIG. 2, depicting the forward sweep area 42 (wherein the paddles, not shown, sweep material toward the inner sweep end) and the rearward return area 40 (wherein the paddles, not shown, travel toward the outer sweep end). The forward sweep area 42 is rearwardly bounded by forward inner walls 46, and the rearward return area 40 is forwardly bounded by rearward inner walls 48 and rearwardly bounded by rearward outer walls 44, with an intermediate space 50 being defined between the forward and rearward return areas 42 and 40 by the area between the forward inner wall 46 and the rearward inner wall 48. Sweep pivots 300R and 300F link the inner sweep section 32 and outer sweep section 36 at the rear side of the rearward outer walls 44, and also at the rear side of the forward inner walls 46 (though a sweep pivot might alternatively or additionally be provided at the front side of the rearward inner walls 48). Two or more sweep pivots are used to link sweep sections 32 and 36 in this manner, rather than using just a single sweep pivot at the rear side of the rearward outer walls 48, to better deter one sweep section from pivoting with respect to the other in a horizontal plane. In FIG. 3, the sweep sections 32 and 36 are shown linked by sweep pivots 300R and 300F which are not configured like the sweep pivot 200 of FIG. 2, but which are instead configured as a simple ball 304 protruding from a bracket 52 on the outer sweep section 36, with the ball 304 being received within a ring-like socket 306 borne on a bracket 54 on the inner sweep section 32. Such an arrangement allows the sweep sections 32 and 36 to vertically pivot with respect to each other, provided the sweep pivots 300R and 300F are located at the same height (as the sweep pivots 300R and 300F together define an axis about which the sections 32 and 36 pivot), though they cannot vertically displace with respect to each other. If the socket 306 is instead elongated such that its interior defines a vertically-extending slot, rather than a simple ring, the sweep sections 32 and 36 may both vertically pivot and displace with respect to each other.

It should be understood that the following conventions are used throughout this document. Initially, when one part is said to be "fixed" to another part, this indicates that the parts are attached in immovable relationship to each other (either directly or via an intervening component). In contrast, the term "attached" more broadly indicates that the parts may be fixed, or may merely be somehow connected as a unit (either directly or via an intervening component), though one part may move with respect to the other.

Further, where this document refers to a "major" or "substantial" portion of some item, this should be understood as meaning over 50% of that item; conversely, "minor portion" indicates less than 50%. In contrast, where this document refers to a "significant portion" of an item, this should be understood as meaning at least 75% of that item.

Moreover, where a measurement or other value is qualified by the term "about" or a like term (for example, "about 50 cm"), this can be regarded as referring to a variation of 10% from the noted value. Thus, "about 50 cm" can be understood to mean between 45 and 55 cm.

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:

1. A bin sweep pivot including:
   a. a shaft;
   b. a ring movably fit about the shaft, whereby the ring is movable along a length of the shaft;
   c. a collar pivotably fit about the ring, whereby the collar is pivotable within a plane coincident with an axis of the shaft.

2. The bin sweep pivot of claim 1 wherein the collar is pivotable about each of two axes which are perpendicular to:
   a. an axis of the shaft, and
   b. each other.

3. The bin sweep pivot of claim 1 wherein at least one of the collar and the ring is rotatable about the circumference of the shaft.

4. The bin sweep pivot of claim 1 wherein the collar extends about at least a substantial portion of the circumference of the shaft.

5. The bin sweep pivot of claim 4 wherein at least a significant portion of the outer surface of the ring conforms to a portion of a sphere.

6. The bin sweep pivot of claim 1 wherein both the collar and the ring extend about at least a substantial portion of the circumference of the shaft.

7. The bin sweep pivot of claim 6 wherein both the collar and the ring extend about the entirety of the circumference of the shaft.

8. The bin sweep pivot of claim 1 wherein at least a significant portion of the inner surface of the collar complementarily fits about the outer surface of the ring.

9. The bin sweep pivot of claim 8 wherein:
   a. the ring is defined by a ball having a passage extending between opposing sides of the ball, and
   b. the shaft extends through the passage.

10. The bin sweep pivot of claim 1 wherein the collar:
    a. extends about at least a substantial portion of:
       (1) the ring, and
       (2) the circumference of the shaft, and
    b. is pivotable about each of two axes which are perpendicular to:
       (a) an axis of the shaft, and
       (b) each other.

11. The bin sweep pivot of claim 1 further including a sleeve:
    a. fit about the shaft, and
    b. extending upwardly from the ring.

12. The bin sweep pivot of claim 11 wherein the sleeve is not attached to the ring.

13. The bin sweep pivot of claim 11:
    a. further including a bin sweep, and
    b. wherein:
       (1) one of the sleeve and the bin sweep has a pin extending therefrom, and
       (2) the other of the sleeve and the bin sweep has an elongated slot defined therein, wherein the pin extends within the slot.

14. The bin sweep pivot of claim 1 wherein the collar is fixed to an inner end of a bin sweep.

15. The bin sweep pivot of claim 14 wherein the shaft extends upwardly from the floor of a grain bin.

16. The bin sweep pivot of claim 1 wherein the collar is fixed to an inner end of a bin sweep.

17. The bin sweep pivot of claim 1:
   a. further including a bin sweep having a length with at least two sweep sections arrayed therealong, and
   b. wherein:
      (1) a first one of the sweep sections is fixed to the collar, and
      (2) a second one of the sweep sections is fixed to the shaft.

18. The bin sweep pivot of claim 17 wherein the shaft is fixed to vertically extend from the second sweep section.

19. A bin sweep pivot including:
   a. a shaft extending upwardly from a bin floor;
   b. a ball movably fit about the shaft, whereby the ball is movable along a length of the shaft;
   c. a collar:
      (1) pivotably fit about the ring, whereby the collar is pivotable within a plane coincident with an axis of the shaft, and
      (2) fixed to an inner end of a bin sweep situated on the bin floor.

20. A bin sweep pivot including:
   a. a bin sweep having a length with at least two sweep sections arrayed therealong,
   b. a ball attached to a first one of the sweep sections, and
   c. a collar:
      (1) pivotably fit about the ball, and
      (2) attached to a second one of the sweep sections.

* * * * *